(12) United States Patent
Buch et al.

(10) Patent No.: US 7,876,517 B2
(45) Date of Patent: Jan. 25, 2011

(54) MEASUREMENT OF ROUND TRIP LATENCY IN WRITE AND READ PATHS

(75) Inventors: Bruce Douglas Buch, Westborough, MA (US); Mathew P. Vea, Shrewsbury, MA (US); Jon Karsten Klarqvist, Roseville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 191 days.

(21) Appl. No.: 12/267,234

(22) Filed: Nov. 7, 2008

(65) Prior Publication Data

US 2010/0118424 A1 May 13, 2010

(51) Int. Cl.
*G11B 5/09* (2006.01)
(52) U.S. Cl. .......................... 360/51; 360/46
(58) Field of Classification Search ................ None
See application file for complete search history.

(56) References Cited

U.S. PATENT DOCUMENTS

| | | | |
|---|---|---|---|
| 5,384,671 | A | 1/1995 | Fisher et al. |
| 6,810,485 | B2 | 10/2004 | McEwen et al. |
| 7,236,324 | B2 | 6/2007 | Albrecht et al. |
| 7,236,325 | B2 | 6/2007 | Albrecht et al. |
| 2006/0256464 | A1* | 11/2006 | Ozdemir ............... 360/46 |
| 2008/0002269 | A1 | 1/2008 | Sakurai et al. |
| 2008/0080082 | A1 | 4/2008 | Erden et al. |

OTHER PUBLICATIONS

U.S. Patent Application Serial No., filed on Nov. 7, 2008, by Barmeshwar Vikramaditya et al., entitled Reduced Read/Write Transition Overhead for Storage Media, 25 pages.
U.S. Patent Application Serial No., filed on Nov. 7, 2008, by Barmeshwar Vikramaditya et al., entitled Write Clock Control System for Media Pattern Write Synchronization, 26 pages.
U.S. Patent Application Serial No., was filed on Nov. 7, 2008, by Bruce Douglas Buch et al., entitled A Write Compensation System, 20 pages.

(Continued)

*Primary Examiner*—Daniell L Negrón
*Assistant Examiner*—Regina N Holder
(74) *Attorney, Agent, or Firm*—Theodore M. Magee; Westman, Champlin & Kelly, P.A.

(57) ABSTRACT

A method and apparatus for measuring latency in a communication path is provided. The technique includes driving a signal such as a square wave on the communication path, such as a write path such that it travels around the write-read path, and sensing a returned signal at one end of the write-read path. A square wave signal corresponding to the square wave driven on the write path is delayed by a predetermined phase thus generating a delayed signal. The returned signal and the delayed signal are mixed, producing a mixed signal. The mixed signal is integrated to obtain an integrated output. The phase by which the delayed signal is shifted is successively adjusted. Returned signals are mixed with such delayed signals until the integrated output is equal to zero. The phase shift amount that results in a nulled integrated output, less a quarter cycle of the square wave, is equal to the round trip latency of the write-read path.

20 Claims, 4 Drawing Sheets

OTHER PUBLICATIONS

U.S. Patent Application Serial No., filed on Nov. 7, 2008, by Bruce Douglas Buch et al. for Eliminating Sector Synchronization Fields for Bit Patterned Media, 21 pages.

U.S. Patent Application Serial No., filed on Nov. 7, 2008, by Bruce Douglas Buch et al. for Interspersed Phase-Locked Loop Fields for Data Storage Media Synchronization, 25 pages.

* cited by examiner

MEASUREMENT OF ROUND TRIP LATENCY IN WRITE AND READ PATHS

CROSS-REFERENCE TO RELATED APPLICATIONS

The present application is related to the following commonly-owned, copending U.S. patent applications, the content of each of which are incorporated herein by reference:

U.S. Publication No. US2008/0080082, published Apr. 3, 2008, by Mehmet Fatih Erden et al., entitled SYNCHRONIZATION FOR DATA COMMUNICATION;

U.S. patent application Ser. No. 12/267,330, filed on Nov. 7, 2008, by Barmeshwar Vikramaditya et al., entitled REDUCED READ/WRITE TRANSITION OVERHEAD FOR STORAGE MEDIA;

U.S. patent application Ser. No. 12/267,168, filed on Nov. 7, 2008, by Barmeshwar Vikramaditya et al., entitled WRITE CLOCK CONTROL SYSTEM FOR MEDIA PATTERN WRITE SYNCHRONIZATION;

U.S. patent application Ser. No. 12/266,677, was filed on Nov. 7, 2008, by Bruce Douglas Buch et al., entitled A WRITE COMPENSATION SYSTEM;

U.S. patent application Ser. No. 12/267,215, filed on Nov. 7, 2008, by Bruce Douglas Buch et al. for ELIMINATING SECTOR SYNCHRONIZATION FIELDS FOR BIT PATTERNED MEDIA; and U.S. patent application Ser. No. 12/267,305, filed on Nov. 7, 2008, by Bruce Douglas Buch et al. for INTERSPERSED PHASE-LOCKED LOOP FIELDS FOR DATA STORAGE MEDIA SYNCHRONIZATION.

BACKGROUND OF THE INVENTION

Background Information

Many storage systems and communication systems experience latencies in the electronics or other portions of the system. More specifically, signals are processed and passed through various electronics and wireless or wired communication links. A given amount of time is associated with the signals traveling on such paths, which time must be accounted for when precise measurements or positioning is required.

One example of a latency is that which occurs on the write-read path in a magnetic recording storage system. For example, hard disk drives (HDDs) manage a large capacity of information being written to and retrieved from the media controlled by the drive. A hard disk drive includes I/O interfaces, read and write head components, encoding and decoding components and servo mechanisms that appropriately position the respective heads over the recording media. These components are controlled by integrated circuits which perform signal processing, encoding and decoding and control the operation of a given head as it writes data to and retrieves data from a disk. In particular, a hard disk drive contains an HDD controller circuit which is coupled to the I/O interface and receives input data and transmits data that has been read from the drive.

Such systems use positioning by reference to the read location in order to determine the correct write location. To do so requires an adjustment between the read location to account for the small distance between the read head and the write head for the write operation. In addition to the actual distance, the latency due to the electronics must also be taken into account.

One example of the type of system in which such a positioning technique is employed is a system that is based upon Bit Patterned Media (BPM). In a recording device that uses BPM, a single domain is provided in a predefined magnetic island per bit, instead of the conventional multiple grains of magnetic material per bit found in continuous recording. The single domain feature of BPM allows the potential for higher areal density by obviating some of the constraints of continuous recording.

Efficient utilization of BPM capacity requires synchronous writing. Thus, the timing of the write clock must be controlled, which requires calculations including the phase difference between the reader and the writer based upon a known read location. This phase difference consists of several components, a principal component being the round trip latency in the write and read paths.

Many of the electronics in the read and write electronics, such as the preamplifier chip, are highly temperature sensitive and voltage sensitive. These are also impacted by environmental conditions. Thus, the latency is due in part to the latency of the electronics, which vary with temperature, voltage and environmental conditions. Thus, the measurement needs to be periodically recalibrated. In addition, during calibrations, it is also advantageous to cancel any parasitic magnetic fields crossing between the write path and the read path ("cross talk")

Therefore, there remains a need for an apparatus and method for accurately measuring the latency in a communications path such as round trip latency in the write and read paths in a storage system, and for recalibrating the measurement. There remains a further need for cancelling cross talk that occurs during the measurement technique.

SUMMARY OF THE INVENTION

These and other needs are provided by the present invention which is a method of measuring latency that includes driving a first signal of a predetermined wave form on a communication path and sensing a return signal at one end of the communication path. The invention further includes delaying a second signal having the same wave form as the first signal by a predetermined phase shift to generate a delayed signal and successively adjusting the phase of the delayed signal until it is in quadrature with the return signal, to thereby to estimate latency in the communication path. The returned signal and the delayed signal are mixed, producing a mixed signal. The mixed signal is integrated to obtain an integrated output. The phase by which the delayed signal is shifted is successively adjusted and returned signals are mixed with such delayed signals until the integrated output is equal to zero. The phase shift amount that results in an integrated output being equal to zero then translates into the latency of the communications path.

A further aspect of the invention provides a system for measuring round trip latency in a storage system that includes a write path and a read path that form a write-read path. In an illustrative embodiment a signal generator is configured to generate signals that in the illustrative embodiment are square waves of selected periods and phases, and is coupled to a write clock. An output of the signal generator is configured to drive a square wave onto a write data line, and the square wave travels through the write-read path to produce a returned signal at and end of the write-read path. A phase adjustment assembly is coupled to the signal generator and configured such that a square wave corresponding to a square wave driven onto the write data line is delayed by a predetermined phase thereby generating a delayed signal. A mixer is configured to receive as inputs and to mix a delayed signal and a respective returned signal to produce a mixed signal, a circuit is configured to perform an integration technique that integrates the mixed signal to produce an output. The output of the mixer, when equal to zero, indicates that the phase of the returned signal is in quadrature with the delayed signed, which thereby translates to latency.

The invention further provides a method for accurately determining write clock phase for positioning a write transducer in a hard disk drive. This method includes: estimating round trip latency in a write-read path that includes driving a square wave onto a write data line to the write-read path and sensing a returned signal at a read channel input; a phase shift assembly that is adapted to generate a delayed signal being a second square wave delayed by a predetermined amount; a mixer that mixes the return signal and the delayed signal; cancelling cross talk from the returned signal; determining a phase shift that relates to the latency of the round trip from which a latency estimation is determined from a phase shift that is in quadrature with the returned signal, and using the latency estimation in an associated write clock phase determination for increasing accuracy of a targeted position for write operations.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
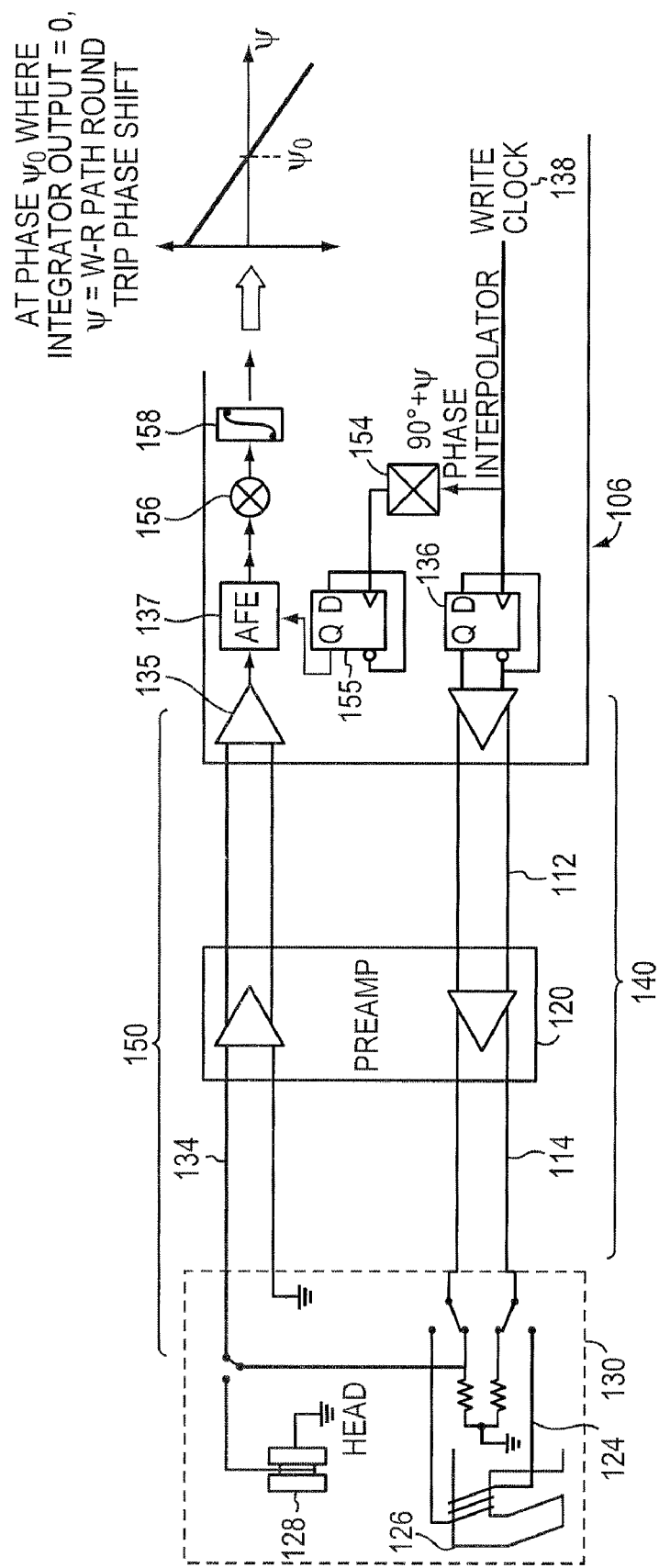
FIG. 1 is a schematic block diagram of a system for measuring round trip write-read path latency in accordance with an illustrative embodiment of the present invention.

FIG. 1 is a schematic block diagram of a system 100 for estimating the phase shift that corresponds to round trip write-read path latency, in accordance with an illustrative embodiment of the present invention. The system 100 is a hard disk drive that typically includes a hard disk drive (HDD) controller, and a read channel circuit, which includes a phase estimation circuit 106 in which the techniques of the present invention are implemented.

Briefly, and by way of further background the HDD controller is a suitable microprocessor and accompanying electronics which are configured to receive I/O inputs from a user or a computer for either writing data or requesting files stored on the disks which are served by the hard disk drive. In a write operation, the HDD controller generates a channel write gate signal and passes this write gate signal to the read channel electronic circuit. Additionally, a second write gate signal is generated by the HDD controller and transmitted to a preamplifier circuit 120. The assertion of this write gate signal causes the preamplifier 120 to enable write current and to begin writing data.

The HDD controller passes write data symbols that it has received from the I/O interface (not shown) to the read channel. The read channel includes electronics to decode the digital data symbols received from the HDD controller and to convert the resulting signals into serialized differential write data output analog signals 112. An oscillator in the read channel produces the voltage transitions that carry the differential write data output analog signals 112.

The preamplifier 120 amplifies the serialized differential write data analog output signals received from the read channel. A write gate signal is asserted by either the read channel or the HDD controller, and the signal is sent to the preamplifier 120. The preamplifier responds with its transducer current amplitude being turned on in response to this write gate signal. The resulting preamplifier write current 114 is transmitted to one or more drive coils 124 of a write transducer 126 in the drive head 130. Magnetic signals, which correspond to the electrical signals 114 sent from the preamplifier 120, are induced at the pole tips of the drive head 130 when the write current is applied to the drive coil. The write transducer 126 applies these magnetic signals to the hard disk media (not shown) at a desired location on the media to write the serialized bit stream onto the media. The present invention relates to precisely identifying the desired location for a write operation by the write transducer.

In a read operation, magnetic signals are read from the disk media by a sensor 128, which may be a giant magnetoresistance (GMR) device. The magnetic signals are converted to electrical signals in the drive head. These electrical signals 134 are sent to the preamp 120 for amplification and are then passed to a read channel input 135; the signals are then decoded in the read channel.

In accordance with the present invention, a phase estimation circuit 106 is provided in the read channel. The phase estimation circuit 106 includes a signal generator 136, which is illustratively a flip flop circuit that is controlled by a write clock signal 138. In accordance with a further aspect of the present invention, when a latency measurement is to be taken or recalibrated, the write data path identified generally by reference number 140 is coupled to the read data path which is identified generally by reference number 150. The write data path and the read data path can be connected (and disconnected) in accordance with the arrangements described with reference to FIGS. 3, 4 and 5, which are alternative embodiments of this aspect of the present invention.

After the write data path 140 is coupled to the read data path 150, a first signal of a predetermined wave form is created by the signal generator 136 using the write clock 138 to control the timing. In accordance with the invention, the first signal is a periodic waveform with a 50% duty cycle. In an illustrative embodiment, the first signal is constructed such that it is a low frequency, long period square wave. In other applications of the invention, this signal may be a sine wave or another signal of a suitable wave form. In the embodiment of FIG. 1, the low frequency square wave assists in resolving cycle ambiguity. More specifically, the low frequency square wave is driven onto the write data path 140 and is sent to the preamplifier 120, and it is then returned via the read path 150. The returned signal is received at the read channel input 135, and is passed to the analog front end (AFE) 137 of the read channel. Then the signal is filtered as described further herein with reference to FIG. 6.

Concurrently, a second signal having the same waveform as the first signal, which in the illustrative embodiment is a square wave, is delayed by a phase ψ that is produced in an adjustable phase interpolator circuit 154 that applies a phase shift to the signal generated by the flip-flop 155, for example. The delayed signal is then mixed with the returned signal by mixer circuit 156. The resulting mixed signal is then integrated by an integrator circuit 158.

Using the phase interpolator 154, the phase ψ of the delayed signal is sequentially adjusted to produce successive adjusted delayed signals. Each respective delayed signal is mixed with the returned signal, and the mixed signal is summed in the integrator 158. This is repetitively performed until a result is obtained at the output of the integrator 158 that is equal to zero. When the output of the integrator is zero, this indicates that the signals cancel each other out because the returned signal is in quadrature (i.e., 90 degrees out of phase) with the delayed square wave. This null result indicates that the signal returned on the read path is delayed by a time corresponding to the known phase shift applied to the phase-shifted signal.

To summarize, in the first step of this process, the outgoing square wave that is driven on to the write data line data is a low frequency signal, the period of which is selected to be longer than the expected latency. This low frequency square wave is used for resolving cycle ambiguity since the cycles of the returned signal will not overlap more than one cycle of the delayed signal. Thus, when the output of the integrator is zero in this first step that means that the cycle of the two signals have been coarsely matched. Then, once the signals are in the same cycle, a more precise measurement is performed in which a higher frequency square wave is driven to the write data line. A corresponding delayed higher frequency signal is mixed with the returned signal. The phase interpolator adjusts the phase delay of the delayed signal and the respective delayed signals are mixed with the respective returned signals until the result of the integrator is zero. As noted, the phase delay imposed on the square wave is the phase shift dialed into the interpolator. The output of the integrator is nulled when the phase of the delayed square wave is 90 degrees out of phase with the returned signal. After this second, fine tuning step, the selected phase $\psi_o$ of the delayed signal that results in nulling the integrator equals a more finely tuned measurement of the latency that occurs on a round trip from the write path to the read path. Thus, phase $\psi_o$ is the write-read round trip phase shift, which translates into the latency.

Figure 2:
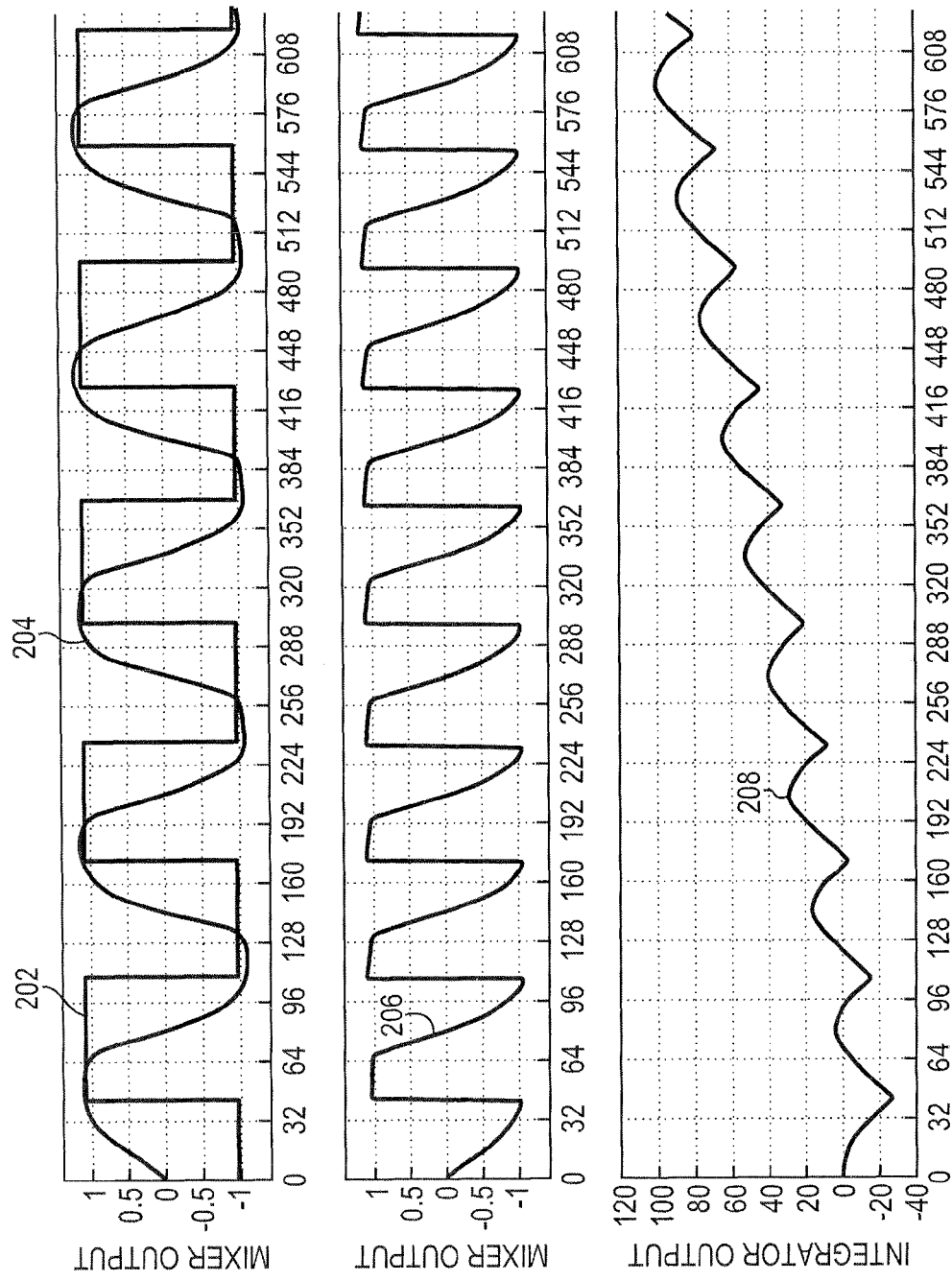
FIG. 2 is a schematic block diagram of the signals that are generated at various points in the circuit of FIG. 1 in accordance with an illustrative embodiment of the method of the present invention.

This can be further understood with reference to FIG. 2. The signal 202 is the square wave produced by the write clock 138 and signal generator 136 (FIG. 1). This is a long period square wave that has a low frequency that allows for the cycle to be determined. The square wave 202 passes through the preamplifier and as it travels the round trip through the read signal path, it is delayed by the circuit latency, and it results in returned signal 204. Additionally, a delayed square wave is sent to the integrator, as described. This delayed square wave is mixed with the returned signal by the mixer 156 to create a mixed signal 206. The mixed signal 206 is integrated, as illustrated by the output signal 208. When the phase is not quite nulled to match the delay, the integrator output 208 drifts positively or negatively away from zero, depending upon whether the applied shift is too little or too much. The example illustrated in FIG. 2 shows the integrator output 208 growing positively. Using the phase interpolator, the phase of the delayed signal is repeatedly adjusted until the mixed signal 206 as sent to the integrator, results in an integrator output of zero. When this condition is satisfied, then the delay is known. It is noted that while in the illustrative embodiment, a phase interpolator is used to adjust the phase of the square wave, it should be understood, however, that there are other methods and circuits that may be readily employed for adjusting the phase of the square wave while remaining within the scope of the present invention.

Once the delay is matched, the waveform of the square wave that is driven on the write path is changed to a higher frequency, or shorter-period, square wave. This allows for more accurate phase estimation. Thus, the higher frequency wave form is driven onto the write path and returns to the phase estimation circuit delayed by the round trip latency, as a returned signal. This signal is mixed with the delayed square wave. The phase shift of the delayed square wave is repetitively adjusted until the output of the integrator is zero. When that happens, the phase shift due to the round trip latency is determined. It is advantageous to perform these calculations often in order to compensate for temperature fluctuations and other environmental conditions that may affect the operation of the components of the write and read paths. Further, it is also advantageous to perform the recalibration measurements during times at which the drive head is idle in order to avoid interrupting the normal read and write operations.

In order to measure the write-read path latency, the write path is coupled to the read path. There are several alternative techniques for connecting the write path to the read path in accordance with the present invention and these alternative embodiments are illustrated in FIGS. 3, 4 and 5.

Figure 3:
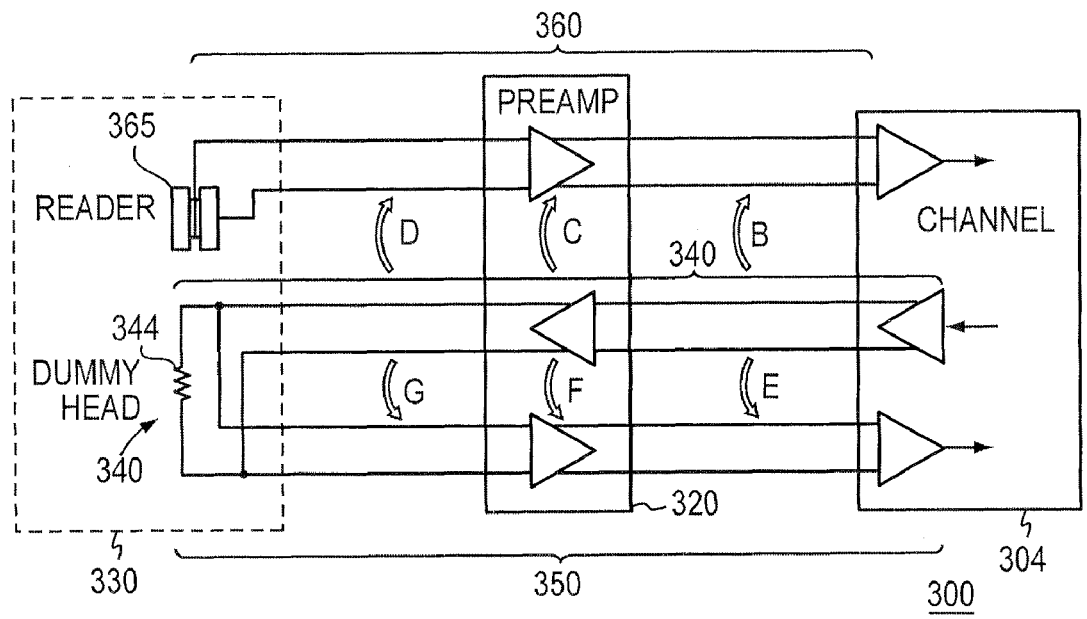
FIG. 3 is a schematic illustration of a system for connecting the write path to the read path for measuring the latency of the round trip of the write-read path using a dummy head in accordance with an illustrative embodiment of the present invention.

FIG. 3 is a schematic illustration of a system 300 for connecting the write path to the read path for measuring the latency of the round trip of the write-read path, which uses a dummy head in the system embodying the invention. The system 300 employs read channel 304 which includes the same electronics as illustrated in FIG. 1, including a circuit similar to the phase estimation circuit 106, which is modified with the connections as follows. A preamplifier circuit 320 amplifies the electrical signals sent to and from the drive head in the manner hereinbefore discussed. However, in accordance with the embodiment of FIG. 3, the head 330 is modified to include a dummy head 340, which has dummy load resistor 344, which mimics the impedance of a writer coil. A dummy write path generally designated by reference character 340 and a dummy read path which is generally designated by reference character 350 are created. In accordance with this aspect of the invention, the round trip write-read latency is simulated by a square wave being driven onto the write data path 340 and being terminated at the "coil" resistor 344. The dummy head is connected back to the read signal path 350, and the signal is returned and then used in the mixer as the returned signal which is mixed with a delayed version of the outgoing square wave. The mixed signal is applied to the integrator, as discussed, to determine the phase shift of the write-read round trip, thus providing a measurement of the latency on the write-read path. The signal in path 360 from the actual head 365 is used in a cross talk cancellation process as described with reference to FIG. 6.

Figure 4:
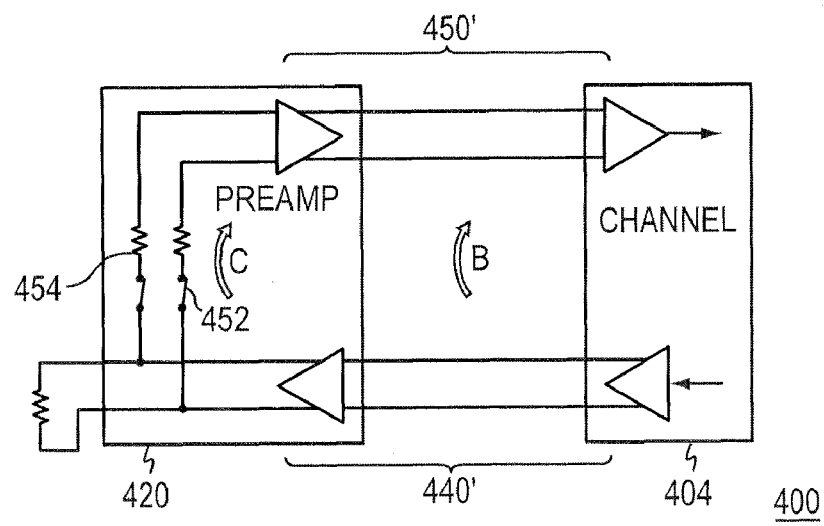
FIG. 4 is a schematic illustration of an alternative embodiment of a system for connecting the write-read path for measuring the latency of the round trip in accordance with an illustrative embodiment of the present invention using the preamplifier.

An alternative embodiment of this aspect of the invention is shown in FIG. 4. FIG. 4 is a schematic illustration of a system 400 of the present invention for connecting the write path to the read path. In this embodiment, a simulation of the write-read round trip is implemented in the preamplifier 420. The portion of the write path 440' that leads to the preamp 420 is coupled to the corresponding portion of the read path 450' as illustrated in FIG. 4. Additionally, switches 452 and 454 are provided which, when closed, couple the write path to the read path. The square wave is sent over the write path portion 440' to the preamplifier 420. The preamplifier passes the signal to the read path portion 450'. This will simulate the full write-read path round trip in cases in which the preamp-to-head latency is a known relatively constant value and does not require periodic recalibration. In that case, the electronics in the latency measuring circuit 106 of the present invention are programmed and configured to use a known preamp-to-head latency value and account for that value in the calculation of the round trip latency.

Figure 5:
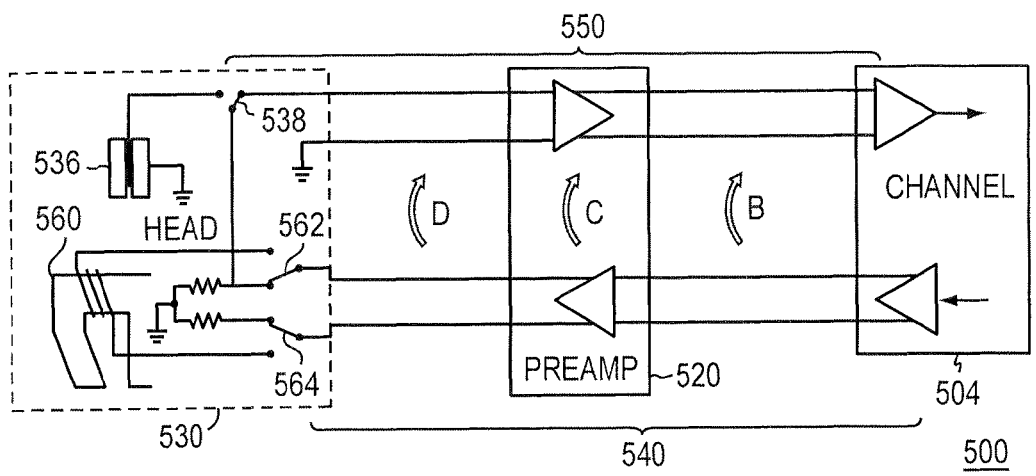
FIG. 5 is a schematic illustration of an alternative embodiment of a system for connecting the write-read path using a series of switches in accordance with an illustrative embodiment of the present invention.

An alternative technique for coupling and de-coupling the signal paths to the read and write head is illustrated in FIG. 5. In the system 500 of FIG. 5, the drive head 530 has a reader 536, which has a switch 538 associated with it that can be switched to couple the signal paths 540, 550 to the reader 536. Alternatively, the switch 538 can be adjusted to its other position which causes it to bypass the reader 536, such that the reader is not in the signal path. In addition, the drive head 530 has a write transducer 560, and switches 562 and 564. The switches 562 and 564 can be adjusted to a closed position such that the write transducer is within the write path, similar to that configuration discussed with reference to FIG. 1. Or, the switches can be adjusted to an open position which bypasses the write transducer, so that the write transducer is not in the signal path. Using the switches, the write-read path can be coupled or de-coupled to the drive head for purposes of the measurements of the present invention to be performed. In addition, the switches 562 and 564, when opened, allow cross talk to be measured so that it can be cancelled in accordance with a further aspect of the invention.

Figure 6:
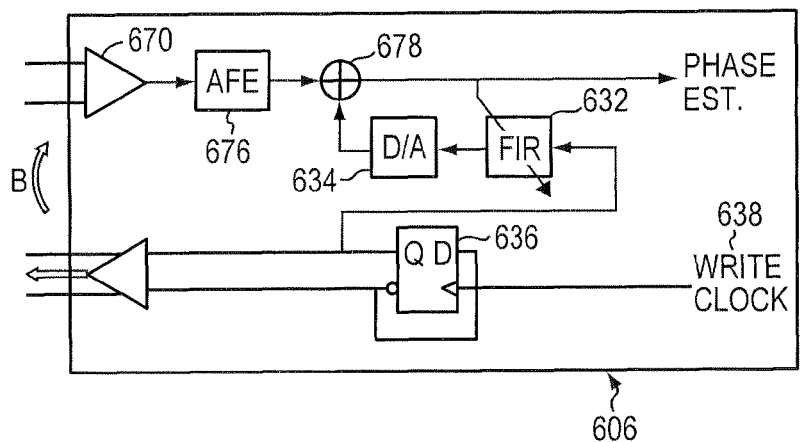
FIG. 6 is a schematic illustration of a circuit for cancellation of cross talk from the write path to the read path in accordance with an illustrative embodiment of the present invention.

More specifically, FIG. 6 is a schematic illustration of a system that includes circuit for cancellation of cross talk. Cross talk is a parasitic signal that travels undesirably from the write path to the read path. In accordance with another aspect of the present invention, a system 600 has an HDD controller and read channel as discussed, however for clarity of illustration, only a simplified schematic of a portion of the phase estimation circuit of the present invention 606 is illustrated. As noted, there can be electromagnetic signals that undesirably short cut the full round trip path and pass between the write path and the read path. Such parasitic signals are referred to herein as "across talk."

The circuit of the present invention includes an adaptive filter for removing this undesired portion of the signal. More specifically, an adaptive finite impulse response filter (FIR) 632 is coupled in the circuit 606 in such a manner that the FIR filters 632 filters out the cross talk from the returned signal. In order to do so accurately, the FIR filter is trained in accordance with this aspect of the invention. The filter is trained with the round trip path interrupted using one of the circuits of FIG. 3, 4 or 5 so that the write signal path is not directly connected to the read path. When the write signal path is interrupted, in such a configuration, the largest component of the returned signal is due to the cross talk. The filter 632 is then adapted using a least mean square (LMS) algorithm to cancel out the cross talk signal. The adaptation algorithm minimizes the power of the output of summer circuit 678. The resulting filter weight will cancel the portion of the AFE 676 output signal that is correlated with the write data, the portion that is cancelled will be the cross talk. Once the adaptation is complete, the weights of filter 632 are saved. These filter weights are then used to cancel the cross talk during the latency estimation, where the read and write paths are connected using one of the techniques described herein with reference to FIGS. 3, 4 and 5.

As discussed, a square wave is then driven onto the write path, and returned on the read path. The returned signal is received at the read channel input 670 (FIG. 6) and is passed to the analog front end (AFE) circuit portion 676. The input to the now weighted FIR filter 632 is binary write data. Its output is converted to an analog signal using the D/A converter 634 and added using an adder circuit 678 to the output signal of the analog front end circuit 676 to produce a filtered signal. This filtered signal is then sent to the phase estimation circuit (106) as described in FIG. 1. In accordance with the present invention, the filtered signal is then provided as the return signal to the mixer, and is mixed with the delayed square wave in the manner hereinbefore discussed to determine the phase shift that is due to the round trip latency in the write-read path.

As can be understood from FIGS. 3, 4 and 5, in order to train the adaptive filter, the round trip write-read path is interrupted. For example, in the circuit of FIG. 3, the signal on the path 360 from the read head 365 is not directly connected to the write path 340. In this embodiment of the invention, the FIR filter is trained to cancel cross talk signals that are schematically designated as B, C and D in FIG. 3, and the trained filter weights are saved. During the latency estimation, these trained filter weights are used to cancel cross talk signals E, F and G from the writer to the bottom (dummy) reader. This embodiment is most advantageously employed when signal paths B, C and D are well matched to E, F and G, respectively. In FIG. 4, the write-read path is interrupted by opening the switches 452 and 454. In FIG. 5, the write-read path is interrupted when switches 538, 562 and 564 are in an open position.

Once the filter is trained as described above, and the FIR filter weights are fixed, the weights that were learned (adapted) in the training process are then used during the latency estimation process. In the latency estimation process, the write and read paths are connected and the FIR filter will subtract out the crosstalk and leave the direct, returned signal for processing as described herein. In the illustrative embodiment, the round trip latency estimation is then used as one of the components of an overall latency determination which is calculated and can be compensated for within the circuitry that generates the timing signals for writing data to the media.

To summarize, the invention provides a method and apparatus for measuring in a communications path such as a round trip latency in a write-read path in a storage system, such as a hard disk drive. The invention includes driving a first signal such as a square wave on the write data line, and sensing a return signal from the read line for calibrating write clock timing control. The technique of the present invention allows the write signal to be returned either at the read-write transducer, or at the output of the preamplifier write path. The return signal is then mixed with another signal which is a phase-shifted version of the first signal that was written to the write data line, where the delay is selectively controlled. The resulting output of the mixer is integrated in an integrator circuit. A phase interpolator, for example, can be used to sequentially adjust the phase of the delayed signal until the output of the integrator is substantially equal to zero. This phase delay imposed on the second signal is the phase shift dialed into the interpolator. The output of the integrator is nulled when the phase of the delayed signal is 90 degrees out of phase with the returned signal. That phase then translates to latency of the path. Once the latency has been measured, this delay can be compensated for within the circuitry that generates the timing signals for writing data to the media.

It should be understood that the present invention provides a method and apparatus for estimating the phase shift that is due to latency in a path such as the round trip latency in the write-read path in a hard disk drive. Using this phase shift estimation, the latency can be measured and can be later recalibrated for continued accuracy such as in the positioning of the write transducer of the drive head. This is particularly useful in BPM recording in which such positioning is more challenging than with other types of recording. However, it should be understood that the apparatus and method of the present invention are not limited to systems that use BPM, but instead readily apply to a wide variety of magnetic recording techniques. The measurements and calibrations of the present invention are further enhanced by the method and apparatus for cancelling cross talk of the present invention, which allows for even greater accuracy in the phase shift measurement. These measurements and calibrations are used to estimate write-read path round trip latency, which is one component of the overall latency that is taken into account when determined the correct write position for the write head in a write operation.

The forgoing description has been directed to specific embodiments of the invention. It will be apparent, however, that other variations and modifications may be made to the described embodiments with the attainment of some or all of the advantages of such. Therefore, it is the objection of the appended claims to cover all such variations and modifications as come within the true spirit and scope of the invention.

What is claimed is:

1. A method of measuring latency, comprising:
   A) driving a first signal of a predetermined wave form on a write data path;
   B) sensing a return signal on a read data path;
   C) delaying a second signal having the same wave form as the first signal by a predetermined phase shift to generate a delayed signal;
   D) successively adjusting the phase shift of the delayed signal until it is in quadrature with the return signal, to thereby to estimate latency along a communication path comprising the write data path and the read data path.

2. The method of measuring latency as defined in claim 1 further comprising:
   A) mixing the return signal and the delayed signal, producing a mixed signal;
   B) integrating the mixed signal to obtain an integrated output;
   C) successively adjusting the phase by which the delayed signal is shifted and repeating steps A through C until said integrated output is equal to zero, which occurs when the delayed signal is in quadrature with the return signal; and
   D) determining the phase shift that results in an integrated output being equal to zero, whereby the latency of the communication path is this phase shift less 90 degrees.

3. The method of measuring latency as defined in claim 2 wherein
   said communication path is in a storage system and said first and second signals are square waves such that driving said first signal includes selecting a first square wave to be driven onto a write data path to have a long period such that the cycle of the square wave is longer than an expected latency in a communication path; and
   resolving cycle ambiguity between the return signal and the delayed signal by reference to the long period signal.

4. The method of measuring latency as defined in claim 3 further comprising, after resolving cycle ambiguity, selecting a square wave to be driven onto the write data path that has a shorter period and using successive delayed signals to determine the phase shift that is determinative of latency in the communication path.

5. The method of measuring latency as defined in claim 3 wherein said write data path is coupled to said read data path in a preamplifier circuit by one or more switches.

6. The method of measuring latency as defined in claim 3 further comprising cancelling cross talk electromagnetic coupling between the write data path and the read data path.

7. The method as defined in claim 6 further comprising cancelling said cross talk by
   interrupting the communication path;
   providing an adaptive filter that receives as an input a cross talk signal as the returned signal;
   performing an LMS algorithm technique to train said filter with coefficients based upon the cross talk signal;
   after determining filter coefficients, programming the filter with said coefficients;
   reconnecting the communication path; and
   using the trained filter to cancel cross talk from the returned signal.

8. The method as defined in claim 7 wherein said communication path is interrupted by one or more switches that are disposed along the communication path, the switches when opened, interrupt the communication path.

9. A system for measuring latency, comprising:
   a signal generator configured to generate square waves of selected periods and phases, and coupled to a write clock, and an output of said signal generator being configured to drive a square wave onto a write data line, which square wave travels through a write-read path to produce a returned signal at an end of said write-read path;
   a phase adjustment assembly coupled to said signal generator and configured such that a square wave corresponding to a square wave driven onto said write data line is delayed by a predetermined phase thereby generating a delayed signal;
   a mixer configured to receive as inputs and to mix a delayed signal and a respective returned signal to produce a mixed signal; and
   a circuit configured to integrate said mixed signal to produce an output, and said output, when equal to zero, indicates that the phase of the delayed signal is in quadrature with the returned signal, which phase less 90 degrees is the latency estimation.

10. The system for measuring latency as defined in claim 9 further comprising:
    an adaptive filter coupled in said read path, said adaptive filter being trained with coefficients based upon cross talk signals detected when said write and read paths have been disconnected, and said filter trained with said coefficients removes cross talk signals from said return signal when said write and read paths are reconnected for measuring latency.

11. The system for measuring latency as defined in claim 10, wherein said write path is coupled to said read path in a preamplifier circuit, and said preamplifier circuit is adapted to include one or more switches that can be opened to disconnect the write path from the read path when said adaptive filter is being trained, and said switches can be closed to reconnect said write path to said read path when round trip latency in the write-read path is being measured.

12. The system for measuring latency as defined in claim 11, wherein said write path is coupled to said read path at a dummy drive head.

13. The system for measuring latency as defined in claim 10 wherein said coefficients are determined by an LMS algorithm.

14. The system for measuring latency as defined in claim 11 wherein said phase adjustment assembly is a phase interpolator adaptable for selecting a desired phase shift.

15. The system for measuring latency as defined in claim 14 wherein said adaptive filter is a finite impulse response filter.

16. The system for measuring latency as defined in claim 11 wherein said signal generator is a flip flop circuit.

17. A method for accurately determining write clock phase for positioning a write transducer in a hard disk drive, comprising:

estimating round trip latency in a write-read path by driving a square wave onto a write data line to the write-read path and sensing a returned signal at a read channel input, cancelling cross talk from the returned signal to produce a filtered signal and a phase shift assembly that is adapted to generate a delayed signal being a second square wave delayed by a predetermined amount, and a mixer that mixes the filtered signal and the delayed signal;

determining a phase shift that relates to the latency of the round trip from which a latency estimation is determined from a phase shift that is in quadrature with the filtered signal; and using the latency estimation such that the latency is compensated for within the circuitry that generates timing signals for writing data to media.

18. The method as defined in claim 17 further comprising determining said phase shift by successively adjusting the phase shift of the delayed signal and integrating the output of the mixer until the integrator output is equal to zero, such that the measured latency is equal to the latency of the phase interpolator less 90 degrees.

19. The method as defined in claim 18 further comprising cancelling cross talk from said return signal using an adaptive filter that has been trained with coefficients related to said cross talk.

20. The method as defined in claim 19 wherein said adaptive filter is trained with the write-read path interrupted, and the latency estimation is performed with the write-read path reconnected.

* * * * *